(12) United States Patent
Ishino et al.

(10) Patent No.: US 7,151,587 B2
(45) Date of Patent: Dec. 19, 2006

(54) LIQUID CRYSTAL DISPLAY DEVICE AND METHOD OF FABRICATING THE SAME

(75) Inventors: Takayuki Ishino, Izumi (JP); Yuji Yamamoto, Izumi (JP); Shinichi Nakata, Izumi (JP); Masami Yamashita, Izumi (JP)

(73) Assignee: NEC LCD Technologies Ltd., Kanagawa (JP)

( * ) Notice: Subject to any disclaimer, the term of this patent is extended or adjusted under 35 U.S.C. 154(b) by 0 days.

(21) Appl. No.: 11/192,122

(22) Filed: Jul. 29, 2005

(65) Prior Publication Data

US 2005/0264745 A1  Dec. 1, 2005

Related U.S. Application Data

(62) Division of application No. 10/715,529, filed on Nov. 19, 2003.

(30) Foreign Application Priority Data

Nov. 19, 2002  (JP) ............................. 2002-335264

(51) Int. Cl.
*G02F 1/1335*  (2006.01)
*G02F 1/13*  (2006.01)
(52) U.S. Cl. ...................................... 349/187; 349/106
(58) Field of Classification Search ................ 349/187, 349/106
See application file for complete search history.

(56) References Cited

FOREIGN PATENT DOCUMENTS

| JP | 11-249169 | 9/1999 |
|----|-----------|--------|
| JP | 2000-29053 | 1/2000 |
| JP | 2002-107758 | 4/2002 |
| JP | 2000-162639 | 6/2002 |
| JP | 2002-182242 | 6/2002 |

*Primary Examiner*—Toan Ton
(74) *Attorney, Agent, or Firm*—Young & Thompson (57) ABSTRACT

There is provided a liquid crystal display device including a display screen comprised of a plurality of areas in each of which a pixel pattern is formed, wherein any two areas located adjacent to each other, among the areas, have at least two stitches therebetween.

4 Claims, 10 Drawing Sheets

LIQUID CRYSTAL DISPLAY DEVICE AND METHOD OF FABRICATING THE SAME

This application is a division of co-pending application Ser. No. 10/715,529, filed on Nov. 19, 2003, the entire contents of which are hereby incorporated by reference.

BACKGROUND OF THE INVENTION

1. Field of the Invention

The invention relates to a liquid crystal display device and a method of fabricating the same, and more particularly to an active matrix type liquid crystal display device and a method of fabricating the same.

2. Description of the Related Art

In a step of forming a pixel electrode and an electrode located in facing relation to the pixel electrode in a process of fabricating a liquid crystal display device, in particular, an in-plane switching type liquid crystal display device, there is usually used stepper projection alignment in which a substrate on which a thin film transistor (TFT) is to be fabricated is divided into a plurality of areas, and each of areas is exposed to light in turn by means of a stepper.

In stepper projection alignment, a difference is made in a line width and registration among layers because of dispersion in a luminance of light to which divided areas of a substrate is exposed, and/or a difference in light-exposure in areas between which a stitch is located. As a result, differences in capacitance are made among electrodes formed on the TFT substrate.

Hence, it is important in stepper projection alignment to reduce non-uniformity in a luminance, caused by the differences in capacitance among electrodes formed on the TFT substrate.

In order to reduce such non-uniformity, Japanese Patent Application Publication No. 2000-162639 has suggested a method of fabricating a liquid crystal display device, including a step of forming a pixel electrode and an electrode located in facing relation to the pixel electrode by stepper projection alignment, in which step, the divided areas located adjacent to each other are designed to have an area overlapping each other, and patterns in the divided areas are arranged in random number sequence in the overlapping area.

Thus, an average capacitance of a pixel electrode and an opposing electrode in the overlapping area is just a half of capacitances of the electrodes in the adjacent divided areas. This ensures that a luminance smoothly changes over the adjacent divided areas between which the overlapping area exists, and hence, image-display quality is enhanced.

However, a problem of a difference in a line width in the adjacent divided area between which an overlapping area exists is not solved in the above-mentioned conventional method. As a result, a viewer can recognize a difference in a luminance between the adjacent areas. This means that the conventional method cannot provide sufficient quality in displaying images.

Japanese Patent Application Publication No. 11-249169 has suggested a liquid crystal display device including a substrate and at least two pixels arranged on the substrate and allowing a light to pass therethrough at different transmittance.

Japanese Patent Application Publication No. 2002-182242 has suggested a method of fabricating a liquid crystal display device, including the steps of dividing at least one of an electrically conductive layer and a dielectric layer to a plurality of areas, and exposing each of the divided areas to light to pattern each of the divided areas such that adjacent divided areas have a zigzag stitch therebetween.

Japanese Patent Application Publication No. 2002-107758 has suggested a method of fabricating a liquid crystal display device, including the steps of dividing a substrate into a plurality of areas, and exposing each of the areas to light by means of a stepper such that two areas located adjacent to each other have an overlapping area which is exposed to light twice. Such an overlapping area is non-linearly formed in a sub-pixel area.

Japanese Patent Application Publication No. 2000-29053 has suggested a method of fabricating a liquid crystal display device, including the step of repeatedly using a mask for exposing each of pixel areas to light.

SUMMARY OF THE INVENTION

In view of the above-mentioned problems in the prior art, it is an object of the present invention to provide a liquid crystal display device in which a viewer seldom recognizes a difference in a luminance in a display screen, and hence, which has qualified characteristic in displaying images.

It is also an object of the present invention to provide a method of fabricating such a liquid crystal display device.

In one aspect of the present invention, there is provided a liquid crystal display device including a display screen comprised of a plurality of areas in each of which a pixel pattern is formed, wherein any two areas located adjacent to each other, among the areas, have at least two stitches therebetween.

It is preferable that the stitches are located differently from one another for each of pixel rows constituting the display screen.

It is preferable that the stitches are located differently from one another for each of pixel rows of color pixels constituting a unit pixel.

In another aspect of the present invention, there is provided a method of fabricating a liquid crystal display device including a step of forming a pixel pattern in each of areas constituting a display screen, by stepping projection alignment, the pixel pattern being formed in each of the areas for each of pixel rows by at least twice carrying out exposure of each of the areas to light such that stitches formed in the exposure between the areas are located differently from one another for the each of pixel rows.

It is preferable that the pixel rows are comprised of a pixel row of first color pixels, a pixel row of second color pixels, and a pixel row of third color pixels, the first, second and third color pixels defining a unit pixel.

It is preferable that a reticle having a certain pixel pattern is commonly used for carrying out exposure of each of the areas to light for each of the pixel rows, and a relative position between the reticle and a substrate is made different in exposure of the each of the areas to light for each of the pixel rows.

In accordance with the above-mentioned present invention, it is possible to reduce a difference in a brightness between adjacent divided areas between which a stitch exists which stitch is inevitably caused in stepper projection alignment. Thus, a liquid crystal display fabricated in accordance with the present invention would have enhanced quality in displaying images.

The above and other objects and advantageous features of the present invention will be made apparent from the following description made with reference to the accompanying drawings, in which like reference characters designate the same or similar parts throughout the drawings.

DESCRIPTION OF THE PREFERRED EMBODIMENTS

Preferred embodiments in accordance with the present invention will be explained hereinbelow with reference to drawings.

[First Embodiment]

Figure 1:
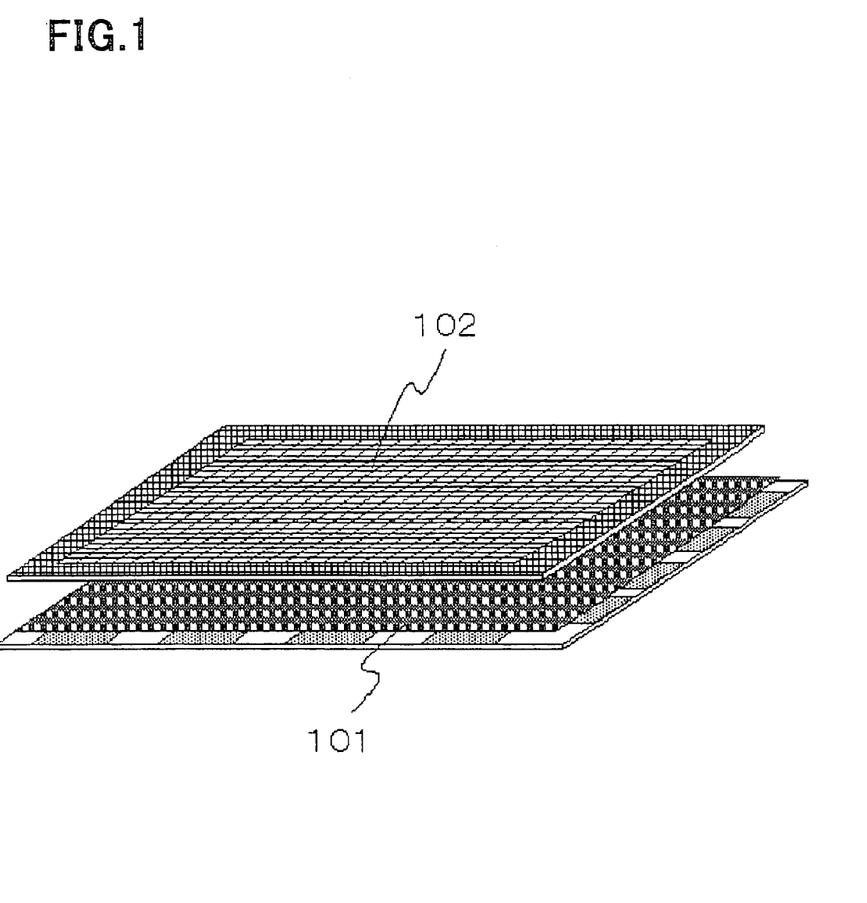
FIG. 1 is a perspective view of a liquid crystal display device in accordance with a first embodiment of the present invention.

FIG. 1 is a perspective view of a liquid crystal display device in accordance with the first embodiment of the present invention.

The liquid crystal display device in accordance with the first embodiment is of an in-plane switching (IPS) type.

As illustrated in FIG. 1, the liquid crystal display device is comprised of a TFT array substrate 101 on which thin film transistors (TFTs) are fabricated in array, and a color filter substrate 102 located in facing relation to the TFT array substrate 101 with a predetermined gap therebetween.

Figure 2:
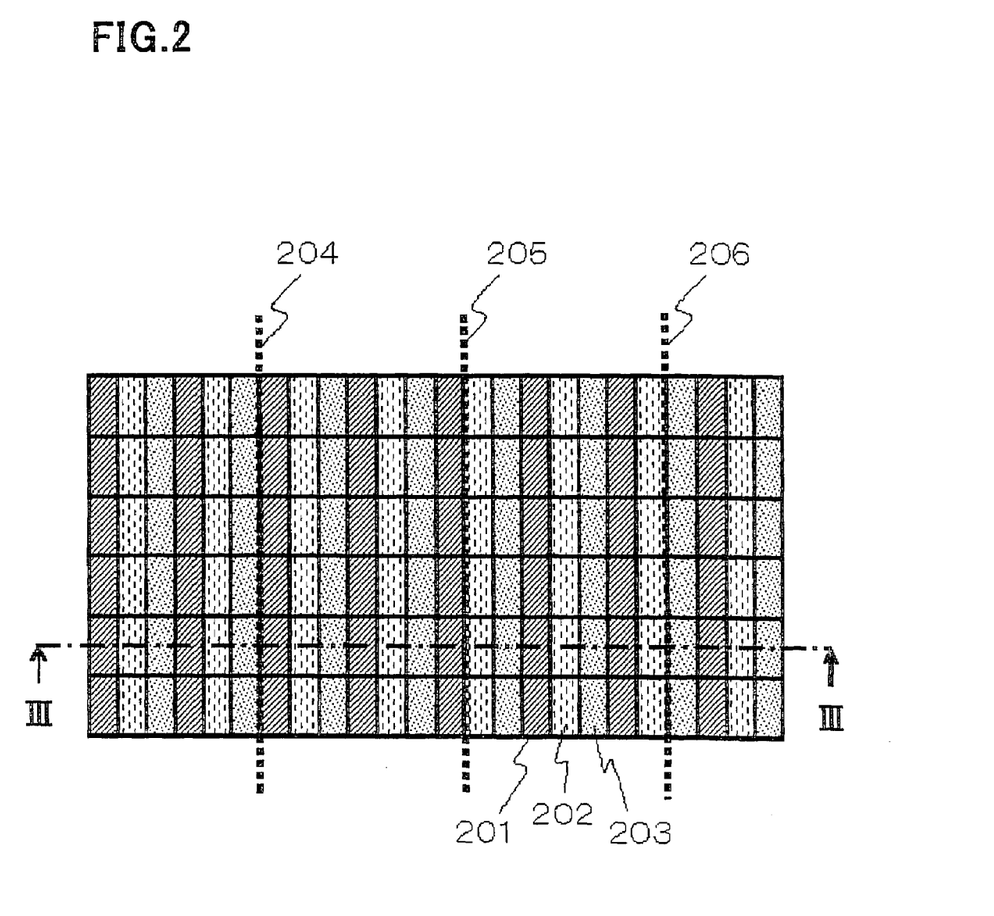
FIG. 2 is a plan view of a TFT array substrate in the liquid crystal display device in accordance with the first embodiment.

FIG. 2 is a plan view of the TFT array substrate 101 in the first embodiment.

On the TFT array substrate 101 are arranged lines of red (R) pixel rows 201, lines of green (G) pixel rows 202, and lines of blue (B) pixel rows 203. A red pixel, a green pixel and a blue pixel located adjacent to one another cooperate to one another to define a unit pixel.

Figure 3A:
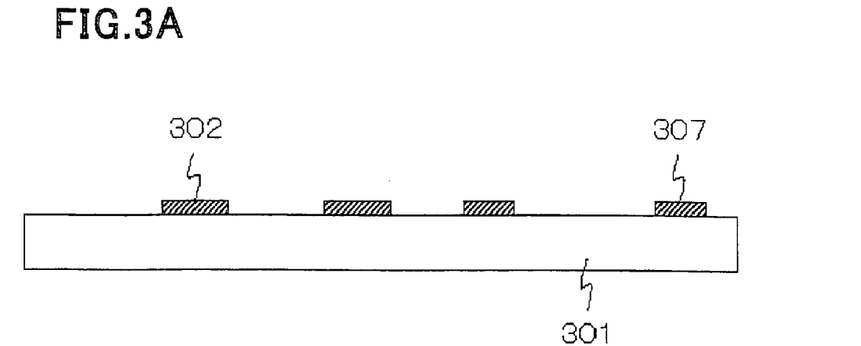
FIG. 3A is a cross-sectional view taken along the line III—III in FIG. 2, showing one of steps of a process of fabrication of the TFT array substrate in the liquid crystal display device in accordance with the first embodiment.
Figure 3B:
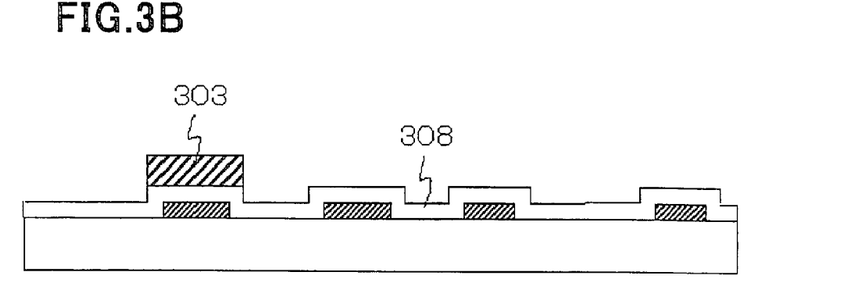
FIG. 3B is a cross-sectional view taken along the line III—III in FIG. 2, showing one of steps of a process of fabrication of the TFT array substrate in the liquid crystal display device in accordance with the first embodiment.
Figure 3C:
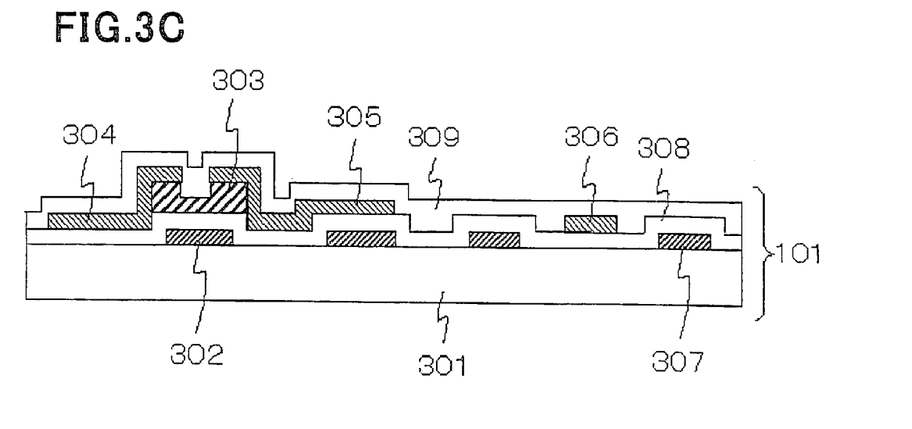
FIG. 3C is a cross-sectional view taken along the line III—III in FIG. 2, showing one of steps of a process of fabrication of the TFT array substrate in the liquid crystal display device in accordance with the first embodiment.

FIG. 3C is a cross-sectional view of the TFT array substrate 101, taken along the line III—III in FIG. 2.

As illustrated in FIG. 3C, the TFT array substrate 101 is comprised of an electrically insulating transparent substrate 301, a gate electrode 302 formed on the substrate 301, an electrode 307 facing a pixel (hereinbelow, referred to as "pixel-facing electrode") and formed on the substrate 301, an electrically insulating inorganic film 308 formed on the substrate 301, covering the gate electrode 302 and the pixel-facing electrode 307 therewith, an amorphous silicon layer 303 formed on the electrically insulating inorganic film 308 above the gate electrode 302, a drain electrode 304 formed on the electrically insulating inorganic film 308 and partially covering the amorphous silicon layer 303 therewith, a source electrode 305 formed on the electrically insulating inorganic film 308 and partially covering the amorphous silicon layer 303 therewith, a pixel electrode 306 formed on the electrically insulating inorganic film 308, and a passivation film 309 covering the amorphous silicon layer 303, the drain electrode 304, the source electrode 305 and the pixel electrode 306 therewith.

The gate electrode 302, the amorphous silicon layer 303, the drain electrode 304 and the source electrode 305 constitute a thin film transistor (TFT).

Since the liquid crystal display device in accordance with the first embodiment is of an in-plane switching (IPS) type, the drain electrode 304 and the pixel electrode 306 are formed in a common layer, the gate electrode 302 and the pixel-facing electrode 307 are formed in a common layer, and the pixel electrode 306 and the pixel-facing electrode 307 are formed in different layers.

FIGS. 3A to 3C are cross-sectional views taken along the line III—III in FIG. 2, each showing one of steps of a process of fabrication of the TFT array substrate 101. Hereinbelow, a process of fabricating the TFT array substrate 101 is explained with reference to FIGS. 3A to 3C.

First, as illustrated in FIG. 3A, the gate electrode 302 and the pixel-facing electrode 307 are formed on the substrate 301.

The substrate 301 is composed of transparent material which is not deformed and denaturalized in annealing. For instance, the substrate 301 is composed of glass, quartz or plastic. In the first embodiment, the substrate 301 is composed of glass.

The gate electrode 302 and the pixel-facing electrode 307 are comprised of a metal film such as a chromium (Cr) or aluminum (Al) film, and formed by sputtering, for instance.

Then, as illustrated in FIG. 3B, the electrically insulating inorganic film 308 is formed on the substrate 301 such that the gate electrode 302 and the pixel-facing electrode 307 are entirely covered with the electrically insulating inorganic film 308.

Then, an amorphous silicon film is formed on the electrically insulating inorganic film 308 by chemical vapor deposition (CVD), for instance. Then, the amorphous silicon film is patterned by photolithography and etching into the amorphous silicon layer 303, as illustrated in FIG. 3B.

Then, the drain electrode 304 and the source electrode 305 are formed on the electrically insulating inorganic film 308 such that they partially cover the amorphous silicon layer 303. Concurrently with the formation of the drain electrode 304 and the source electrode 305, the pixel electrode 306 is formed on the electrically insulating inorganic film 308. That is, are formed in a common layer.

The drain electrode 304, the source electrode 305 and the pixel electrode 306 are comprised of a metal film such as a chromium (Cr) or aluminum (Al) film, and formed by sputtering, for instance.

Then, as illustrated in FIG. 3C, the passivation film 309 comprised of a silicon oxide film or a silicon nitride film is formed entirely over the electrically insulating inorganic film 308, the drain electrode 304, the amorphous silicon layer 303, the source electrode 305 and the pixel electrode 306 by sputtering or CVD.

Thus, the TFT array substrate 101 is completed.

In each of the steps in the above-mentioned method, the gate electrode 302, the pixel-facing electrode 307, the amorphous silicon film 303, the drain electrode 304, the source electrode 305 and the pixel electrode 306 are all patterned by photolithography. The step of exposing them to light, which is a most important step in patterning them, is carried out as stepper projection alignment which is usually used in fabrication of middle- and large-sized panels of five-inches or more size.

In particular, in the step of exposing a metal layer to light for fabrication of the pixel electrode 306 and the pixel-facing electrode 307, stepper projection alignment is carried out for each of color pixels by shifting a stitch.

Specifically, as illustrated in FIG. 2, stepper projection alignment is carried out at a first stitch position 204 for the red pixel rows 201, at a second stitch position 205 for the green pixel rows 202, and at a third stitch position 206 for the blue pixel rows 203.

Figure 4A:
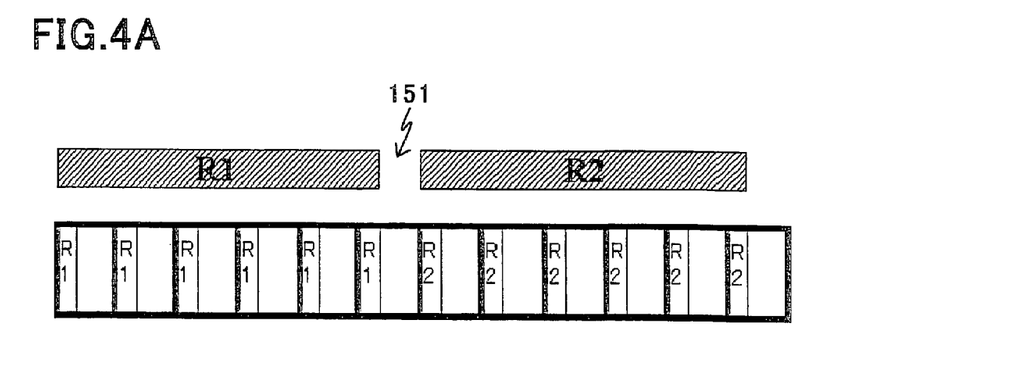
FIGS. 4A, 4B and 4C are plan views of pixel rows to explain stepper projection alignment in the first embodiment.
Figure 4B:
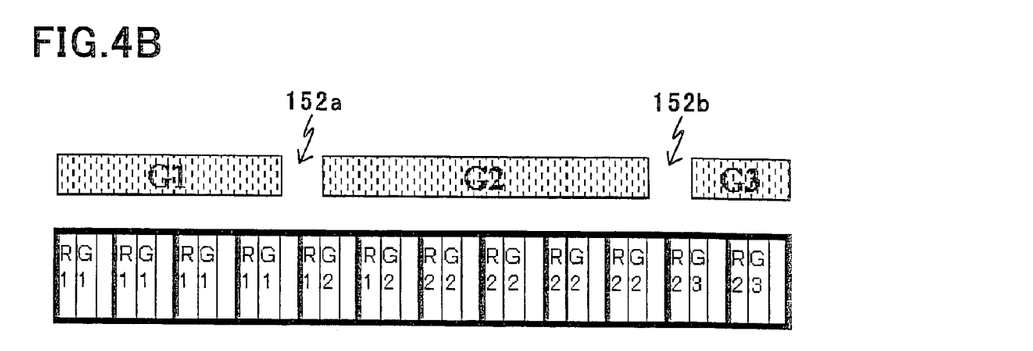
Figure 4C:
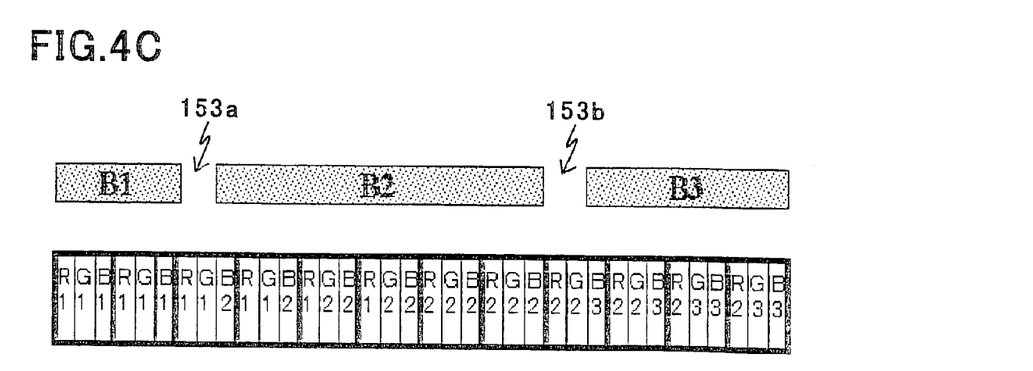

With reference to FIGS. 4A to 4C, stepper projection alignment is explained hereinbelow. In FIGS. 4A to 4C, an upper half indicates a location of a reticle, and a lower half indicates a pixel pattern of the TFT array substrate 101 in association with each of patterns of the reticle.

In the conventional stepper projection alignment, the TFT array substrate 101 is exposed to light with one stitch 151, as illustrated in FIG. 4A.

In contrast, in the first embodiment, stepper projection alignment is carried out three times in an area. Specifically, stepper projection alignment is carried out at the stitch 151 for exposure of red pixels, then, at two stitches 152a and 152b (see FIG. 4B) for exposure of green pixels, and finally, at two stitches 153a and 153b (see FIG. 4C) for exposure of blue pixels. Thus, the stitches are located different from one another for each of red, green and blue color pixels, as illustrated in FIGS. 4A, 4B and 4C.

Figure 5:
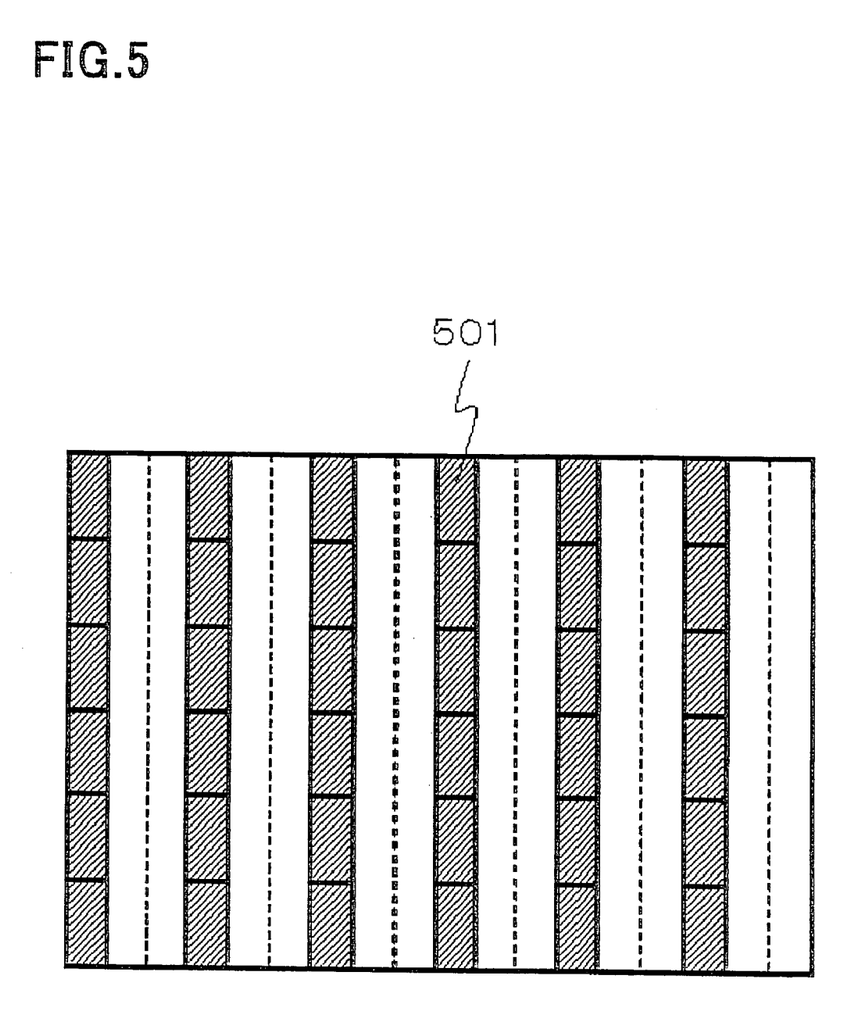
FIG. 5 is a plan view of a reticle used in stepper projection alignment in the first embodiment.

In each of the exposure steps for each of red, green and blue color pixels, a reticle is commonly used by shifting in each of red, green and blue color pixels. FIG. 5 is a plan view illustrating an example of the reticle. The reticle is designed to have a common pattern 501 for each of red, green and blue color pixels.

Hence, with respect to a unit pixel comprised of red, green and blue pixels, the stitches are located different from one another for each of red, green and blue color pixels by shifting an exposure area in the first embodiment, unlike the conventional stepper projection alignment in which the TFT array substrate is divided into unit pixel areas. Hence, the first embodiment provides an advantage that a difference in a capacitance and an aperture ratio can be reduced which difference is caused by a difference in a line width and/or registration of a layer between adjacent areas between which a stitch exists.

The above-mentioned advantage of the first embodiment is further explained hereinbelow with reference to FIG. 6 to 8.

Figure 6:
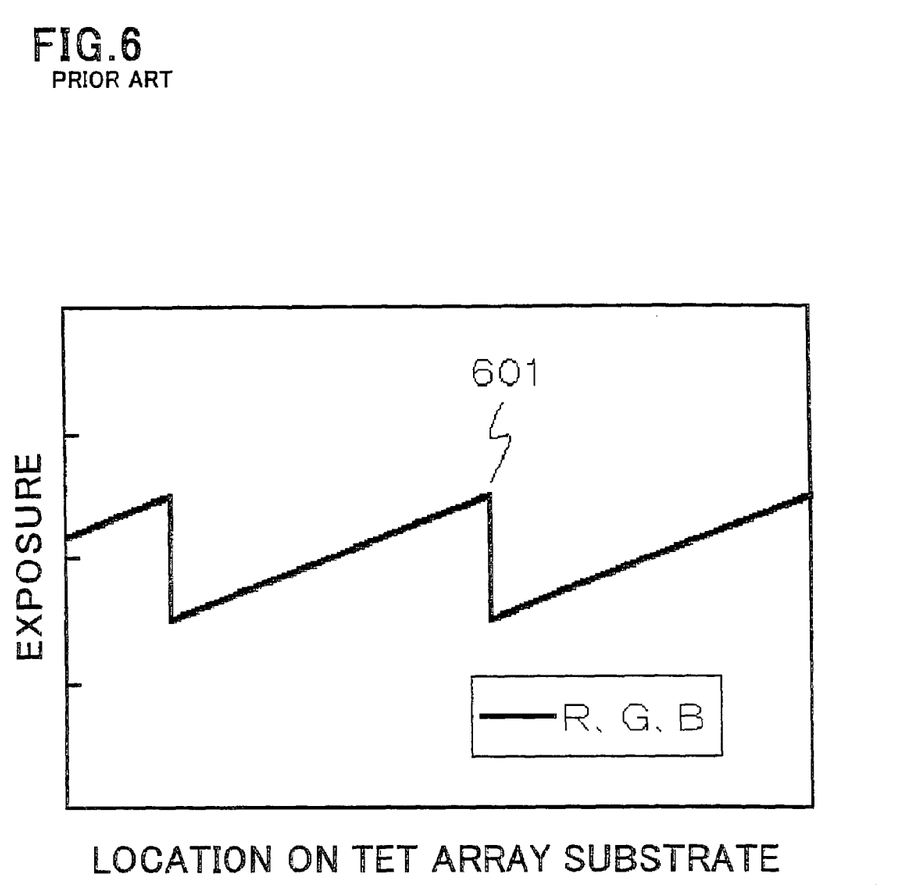
FIG. 6 is a graph showing exposure of a substrate to light in the conventional stepper projection alignment.

FIG. 6 shows a relation between exposure and a location of a TFT array substrate in the conventional stepper projection alignment.

As is obvious in view of FIG. 6, a stitch remains in the same position for each of red, green and blue pixels when a substrate is exposed to light, and resultingly, exposure remarkably increases at the stitch 601.

Figure 7:
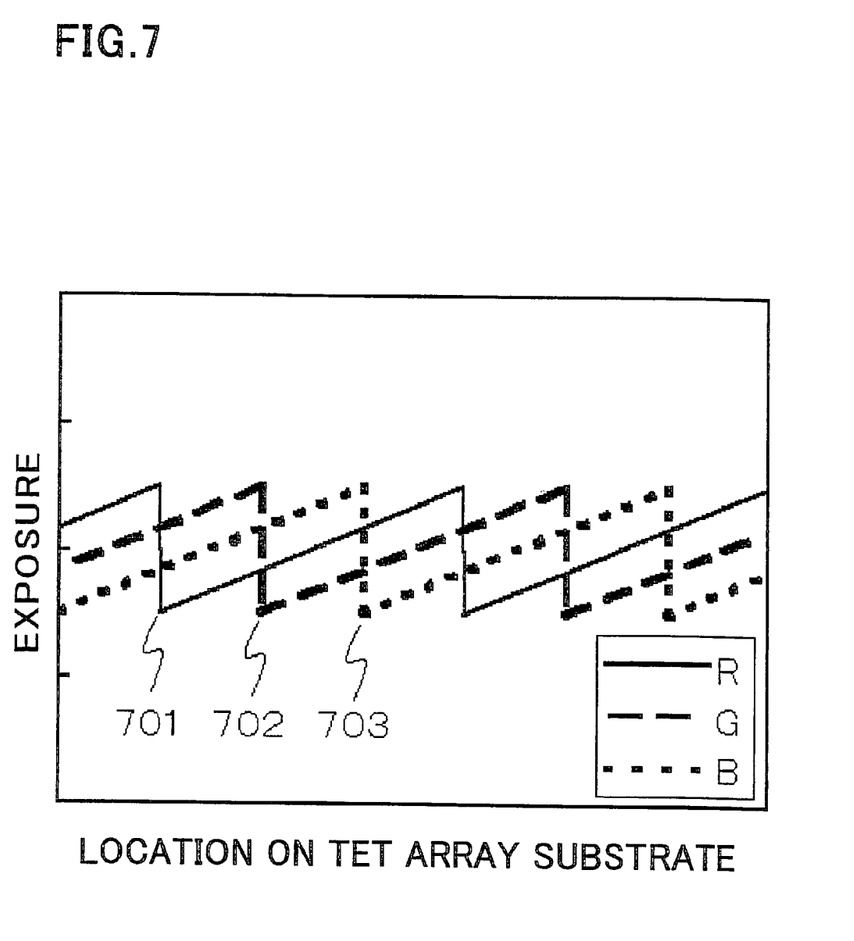
FIG. 7 is a graph showing exposure of a substrate to light in the stepper projection alignment in the first embodiment.

FIG. 7 shows a relation between exposure and a location of the TFT array substrate 101 in the first embodiment.

In accordance with the first embodiment, a first stitch 701 for exposure of the TFT array substrate 101 to light for red pixels, a second stitch 702 for exposure of the TFT array substrate 101 to light for green pixels, and a third stitch 703 for exposure of the TFT array substrate 101 to light for blue pixels are located differently from one another, as illustrated in FIG. 7.

Though exposure remarkably varies at each of the first to third stitches 701, 702 and 703, a degree in which exposure varies in each of red, green and blue pixels in the first embodiment is equal to the same in the conventional stepper projection alignment.

By fabricating the pixel electrode 306 and the pixel-facing electrode 307 by stepper projection alignment in accordance with the exposure profiles illustrated in FIGS. 6 and 7, a luminance in a panel would have a profile in accordance with the exposure profile.

In color pixels in which exposure smoothly varied across a stitch, a luminance would not vary discontinuously, and hence, quality in displaying images is not deteriorated. Accordingly, attention may be paid to variance in a luminance in color pixels exposure for which varies discontinuously across a stitch.

Figure 8:
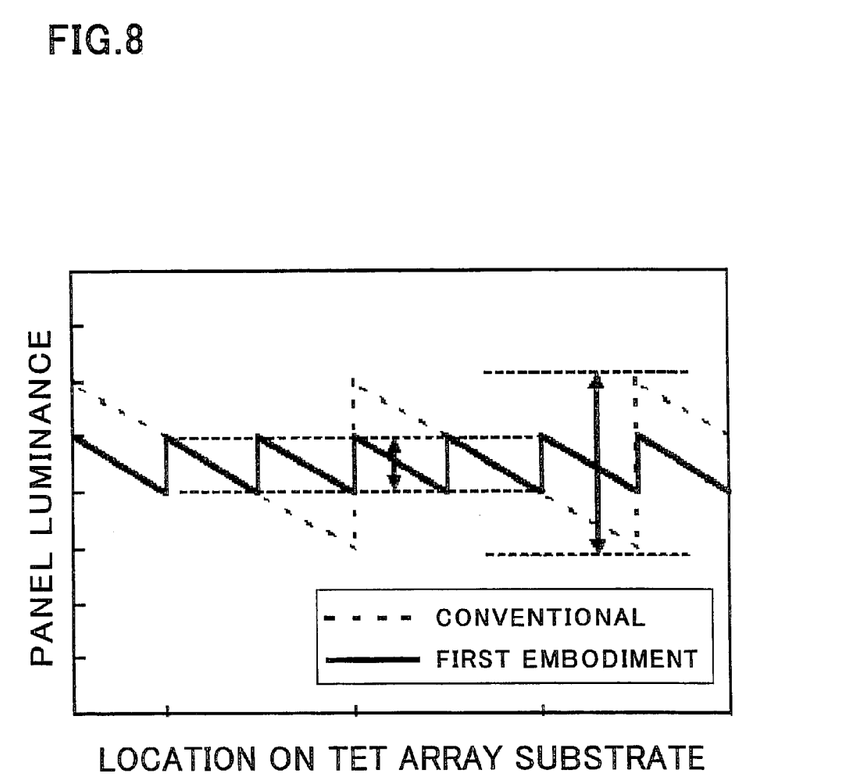
FIG. 8 is a graph showing a luminance in a unit pixel in the liquid crystal display device in accordance with the first embodiment.

Hence, a luminance profile in a panel in a unit pixel is such a profile as illustrated in FIG. 8.

As is obvious in view of FIG. 8, in accordance with the first embodiment, a luminance varies at a stitch only in any one of red, green and blue pixels with respect to a unit pixel comprised of red, green and blue pixels. Hence, comparing to the conventional stepper projection alignment in which a luminance varies for all of red, green and blue pixels in stepper projection alignment, a luminance difference across a stitch is about one-third (⅓). That is, the first embodiment can reduce a luminance difference between adjacent divided areas to a greater degree than the conventional method.

[Second Embodiment]

Figure 9A:
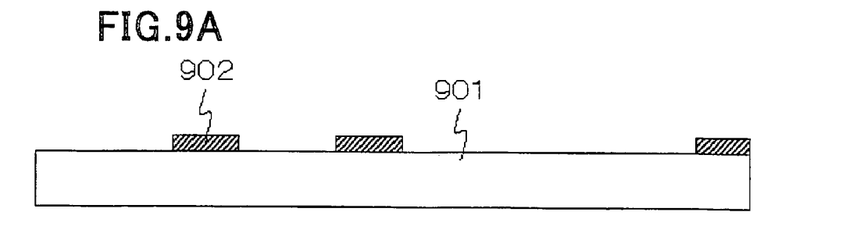
FIG. 9A is a cross-sectional view of a liquid crystal display device in accordance with the second embodiment, showing one of steps of a process of fabrication of the TFT array substrate in the second embodiment.
Figure 9B:
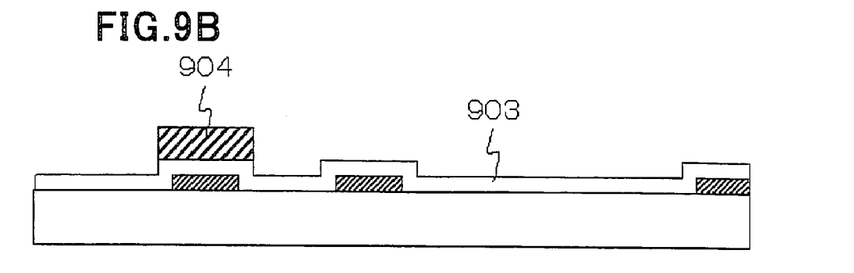
FIG. 9B is a cross-sectional view of a liquid crystal display device in accordance with the second embodiment, showing one of steps of a process of fabrication of the TFT array substrate in the second embodiment.
Figure 9C:
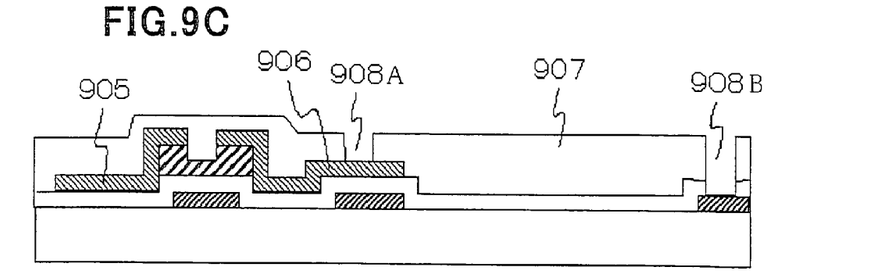
FIG. 9C is a cross-sectional view of a liquid crystal display device in accordance with the second embodiment, showing one of steps of a process of fabrication of the TFT array substrate in the second embodiment.
Figure 9D:
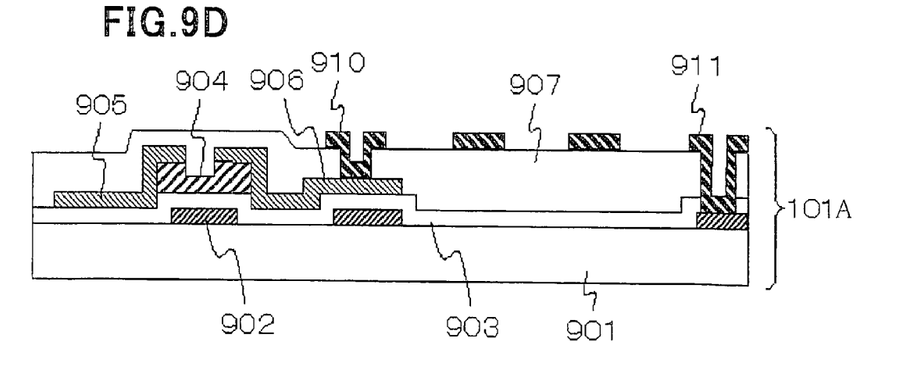
FIG. 9D is a cross-sectional view of a liquid crystal display device in accordance with the second embodiment, showing one of steps of a process of fabrication of the TFT array substrate in the second embodiment.

FIG. 9D is a cross-sectional view of a TFT array substrate in a liquid crystal display device in accordance with the second embodiment.

As illustrated in FIG. 9D, the TFT array substrate 101A is comprised of an electrically insulating transparent substrate 901, a gate electrode 902 formed on the substrate 901, an electrically insulating inorganic film 903 formed on the substrate 301, covering the gate electrode 902 therewith, an amorphous silicon layer 904 formed on the electrically insulating inorganic film 903 above the gate electrode 902, a drain electrode 905 formed on the electrically insulating inorganic film 903 and partially covering the amorphous silicon layer 904 therewith, a source electrode 906 formed on the electrically insulating inorganic film 903 and partially covering the amorphous silicon layer 904 therewith, a passivation film 907 covering the amorphous silicon layer 904, the drain electrode 905, the source electrode 906 and the electrically insulating inorganic film 903 therewith, a pixel electrode 910 formed on the passivation film 907 and making electrical contact with the source electrode 906 through a contact hole, and an electrode 911 facing a pixel (hereinbelow, referred to as "pixel-facing electrode"), formed on the passivation film 907 and making electrical contact with the gate electrode through a contact hole.

In the TFT array substrate 101A in the second embodiment, the pixel electrode 910 and the pixel-facing electrode 911 are concurrently formed on the passivation film 907. The present invention may be applied to the step of concurrently forming the pixel electrode 910 and the pixel-facing electrode 911.

FIGS. 9A to 9D are cross-sectional of the TFT array substrate 101A, each showing one of steps of a process of fabrication of the TFT array substrate 101A. Hereinbelow, a process of fabricating the TFT array substrate 101A is explained with reference to FIGS. 9A to 9D.

First, as illustrated in FIG. 9A, the gate electrode 902 is formed on the substrate 901.

Then, as illustrated in FIG. 9B, the electrically insulating inorganic film 903 is formed on the substrate 901 such that the gate electrode 902 is entirely covered with the electrically insulating inorganic film 903.

Then, the amorphous silicon layer 904 is formed on the electrically insulating inorganic film 903 above the gate electrode 902, as illustrated in FIG. 9B.

Then, as illustrated in FIG. 9C, the drain electrode 905 and the source electrode 906 are formed on the electrically insulating inorganic film 903 such that they partially cover the amorphous silicon film 904 therewith.

Then, the passivation film 907 is formed entirely over the substrate 901, as illustrated in FIG. 9C.

Then, contact holes 908A and 908B are formed throughout the passivation film 907 in alignment with the source electrode 906 and the gate electrode 902, as illustrated in FIG. 9C.

Then, the pixel electrode 910 is formed on the passivation film 907 and making electrical contact with the source electrode 906 through the contact hole 908A, and concurrently, the pixel-facing electrode 911 is formed on the passivation film 907 and making electrical contact with the gate electrode 902 through the contact hole 908B, as illustrated in FIG. 9D.

Thus, the TFT array substrate 101A in the second embodiment is completed.

In the first and second embodiments, a step of exposing the substrate to light is carried out three times for each of red, green and blue pixels in a divided area. However, it should be noted that a step of exposing the substrate to light may be carried out four or more times.

With reference to FIGS. 10A to 10D, a process of carrying out stepper projection alignment four times is explained hereinbelow. In FIGS. 10A to 10D, an upper half indicates a location of a reticle, and a lower half indicates a pixel pattern of the TFT array substrate 101A in association with each of patterns of the reticle.

It is assumed that four pixel rows A, B, C and D are arranged on the TFT array substrate 101A.

Figure 10A:
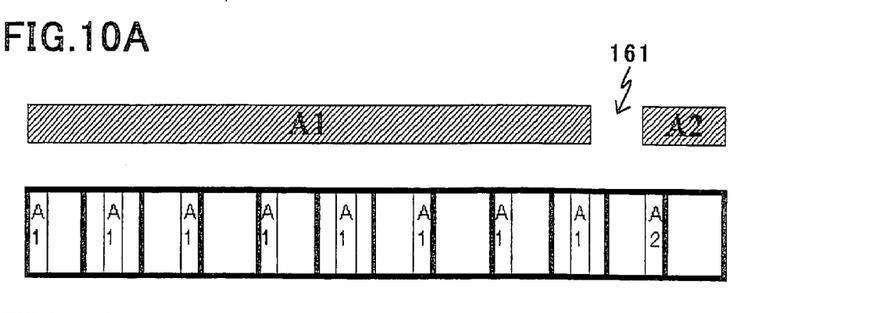
FIGS. 10A, 10B, 10C and 10D are plan views of pixel rows to explain stepper projection alignment in the second embodiment.

First, stepper projection alignment is carried out at a stitch 161 for exposure of the pixel rows A, as illustrated in FIG. 10A.

Figure 10B:
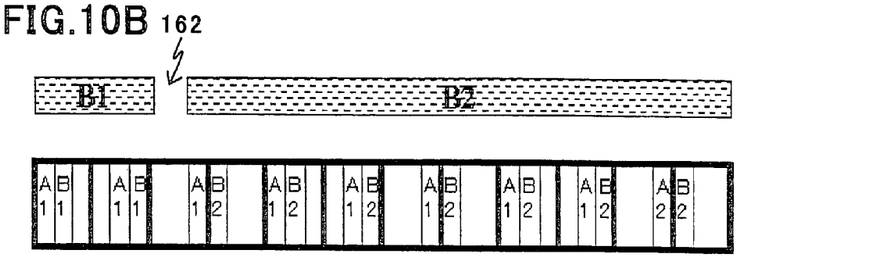

Second, stepper projection alignment is carried out at a stitch 162 for exposure of the pixel rows B, as illustrated in FIG. 10B.

Figure 10C:
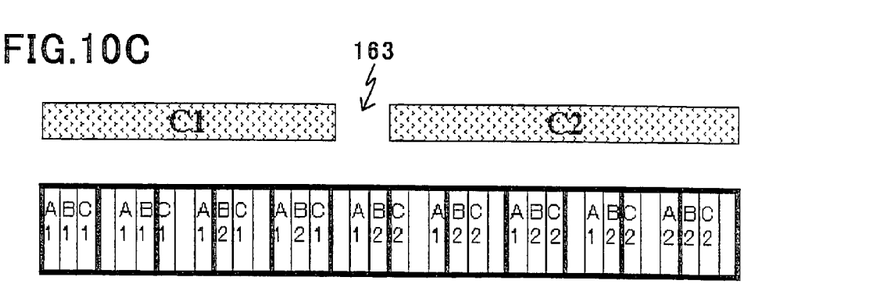

Third, stepper projection alignment is carried out at a stitch 163 for exposure of the pixel rows C, as illustrated in FIG. 10C.

Figure 10D:
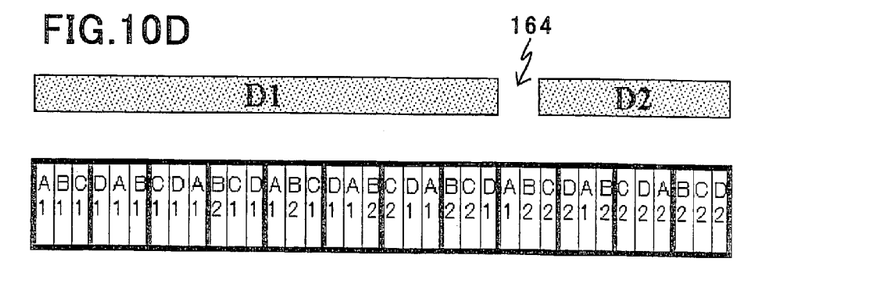

Finally, stepper projection alignment is carried out at a stitch 164 for exposure of the pixel rows D, as illustrated in FIG. 10D.

Thus, the four stitches 161 to 164 are located different from one another for each of the pixel rows A to D, as illustrated in FIGS. 10A to 10D.

In each of the exposure steps for each of pixel rows A to D, a reticle such as one illustrated in FIG. 5 is commonly used by shifting in each of pixel rows A to D. FIG. 5 is a plan view illustrating an example of the reticle.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

The entire disclosure of Japanese Patent Application No. 2002-335264 filed on Nov. 19, 2002 including specification, claims, drawings and summary is incorporated herein by reference in its entirety.

What is claimed is:

1. A method of fabricating a liquid crystal display device including a step of forming a pixel pattern comprising immediately adjacent, differently colored pixel rows, in each of areas constituting a display screen, by stepping projection alignment, said pixel pattern being formed in each of said areas for each of the pixel rows by at least twice carrying out exposure of each of said areas to light such that stitches formed in said exposures are located differently from one another for each of said pixel rows, wherein, within one area, there are at least two exposures of the one area to light, a first of the two exposures exposing only pixel rows of first color pixels, a second of the two exposures exposing only pixel rows of second color pixels, and each stitch resulting from the first exposure being located differently from each stitch resulting from the second exposure.

2. The method as set forth in claim 1, wherein, said pixel rows are further comprised of pixel rows of third color pixels, a set of said first, second and third color pixels defining a unit pixel, and said pixel pattern forming step further comprises a third exposure of the one area to light, the third exposure exposing only pixel rows of the third color pixels, and each stitch resulting from the first exposure being located differently from each stitch resulting from the second and third exposures, each stitch resulting from the second exposure being located differently from each stitch resulting from the first and third exposures, and each stitch resulting from the third exposure being located differently from each stitch resulting from the first and second exposures.

3. The method as set forth in claim 1, wherein, a reticle having a certain pixel pattern is commonly used for carrying out each exposure of each of said areas to light for each of said pixel rows, and a relative position between said reticle and a substrate is made different in exposure of said each of said areas to light for each of said pixel rows, and within the one area, the reticle is located at a first stitch position for the first of the two exposures exposing only pixel rows of the first color pixels, and the reticle is located at a second stitch position for the second of the two exposures exposing only pixel rows of the second color pixels.

4. The method as set forth in claim 2, wherein a reticle having a certain pixel pattern is commonly used for carrying out each exposure of each of said areas to light for each of said pixel rows, and a relative position between said reticle and a substrate is made different in exposure of said each of said areas to light for each of said pixel rows, and within the one area, the reticle is located at a first stitch position for the first exposure, the reticle is located at a second stitch position for the second exposure, and the reticle is located at a third stitch position for the third exposure.

* * * * *